(12) United States Patent
Madhav

(10) Patent No.: US 9,731,824 B2
(45) Date of Patent: Aug. 15, 2017

(54) UNIQUE SYSTEM AND METHOD OF CREATING SCENES WITHIN A MOVING VEHICLE SUCH AS AN AIRCRAFT

(71) Applicant: The Boeing Company, Chicago, IL (US)

(72) Inventor: Jagdish T. Madhav, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/645,101

(22) Filed: Mar. 11, 2015

(65) Prior Publication Data

US 2016/0264243 A1    Sep. 15, 2016

(51) Int. Cl.
| | | |
|---|---|---|
| *B64D 11/00* | (2006.01) | |
| *H04N 9/31* | (2006.01) | |
| *G03B 21/13* | (2006.01) | |
| *G03B 21/14* | (2006.01) | |
| *G03B 31/00* | (2006.01) | |

(52) U.S. Cl.
CPC ........ *B64D 11/0015* (2013.01); *B64D 11/003* (2013.01); *B64D 11/0023* (2013.01); *G03B 21/13* (2013.01); *G03B 21/145* (2013.01); *G03B 31/00* (2013.01); *H04N 9/3147* (2013.01)

(58) Field of Classification Search
CPC ............ B64D 11/0015; B64D 11/0023; B64D 11/003; G03B 21/13; G03B 21/145; G03B 31/00
See application file for complete search history.

(56) References Cited

U.S. PATENT DOCUMENTS

| | | | | | |
|---|---|---|---|---|---|
| 5,077,154 | A | * | 12/1991 | Corley | ................... G03B 21/13 353/29 |
| 5,959,717 | A | * | 9/1999 | Chaum | ................... G03B 21/26 352/133 |
| 6,814,448 | B2 | * | 11/2004 | Ioka | ...................... G03B 21/005 348/745 |

(Continued)

FOREIGN PATENT DOCUMENTS

| | | |
|---|---|---|
| JP | 2004312480 A | 4/2011 |
| WO | WO9525292 A1 | 9/1995 |

OTHER PUBLICATIONS

European Patent Office; Extended European Search Report for European Patent Application No. 16159816.4 ; dated Aug. 10, 2016.

*Primary Examiner* — Valentina Xavier
(74) *Attorney, Agent, or Firm* — Parsons Behle & Latimer

(57) ABSTRACT

A vehicle projection system that includes a projector positioned adjacent a first portion of a ceiling of the vehicle, the projector being configured to project a first image on the first portion of the ceiling. The image may be a moving image or may be various natural sky scenes such as a starry sky. The projector may be a pico-projector or a micro-projector. The vehicle may be an aircraft with the projector positioned on an overhead portion of the cabin. The projector may be positioned between two overhead bins. A second projector positioned on an overhead portion of the cabin may be configured to project a second image on a second portion of the ceiling. The projectors may be positioned on curtain headers within the aircraft. The system may include a control panel that controls the operation of the projectors in conjunction with an onboard sound system, if any.

19 Claims, 5 Drawing Sheets

(56) References Cited

U.S. PATENT DOCUMENTS

| | | | |
|---|---|---|---|
| 8,461,505 B2* | 6/2013 | Budinger | B60Q 3/025 250/208.1 |
| 9,158,185 B2* | 10/2015 | Petrisor | G06F 3/017 |
| 2010/0201951 A1 | 8/2010 | Budinger et al. | |
| 2011/0095911 A1* | 4/2011 | Babst | H04N 9/3147 340/945 |
| 2013/0235351 A1 | 9/2013 | Sachdev et al. | |

* cited by examiner

UNIQUE SYSTEM AND METHOD OF CREATING SCENES WITHIN A MOVING VEHICLE SUCH AS AN AIRCRAFT

FIELD OF THE DISCLOSURE

The embodiments described herein relate to a method and system of projecting a desired image onto an interior portion of an aircraft.

BACKGROUND

Description of the Related Art

Vehicles, especially mass transit vehicles, may include lighting used to create a theme, mood, or effect during travel. For example, color lights, such as light-emitting diodes (LEDs) may be used to illuminate a portion of the interior with a desired color. For example, an airline may prefer to have the ceiling of an aircraft to be one color during boarding, but a different color during cruising, and maybe even a different color during landing and takeoff procedures. While the use of a number of different LEDs may permit different color schemes in the interior of a vehicle, the LEDs may not permit a wide variation of themes or effects. For example, the lighting only permits the illumination of the cabin in a particular color.

Present lighting schemes may be limited to the color of LEDs already installed on the vehicle, which may limit the number of different colors to just a few colors due to space constraints. The use of LEDs lighting may require a significant effort if it is desired to change the colors and/or theme that may be displayed within the vehicle especially when requiring an addition of starry skies, shooting stars and/or constellations on the ceiling of a vehicle, such as an aircraft. Present lighting systems do not permit the displaying of a company logo and/or brand. Other drawbacks of current vehicle theme and/or lighting systems may exist.

SUMMARY

The present disclosure is directed to a method and system that overcomes some of the problems and disadvantages discussed above.

One example embodiment supported by the disclosure is a vehicle projection system comprising a first projector positioned adjacent to a first portion of a ceiling of a vehicle, wherein the first projector is configured to project a first image on the first portion of the ceiling. The image may be a moving image. The image may be a starry sky, northern sky, moon, constellation, and/or other natural sky scene. The image may be projected in conjunction with sound from an on board sound system. The projector may be a pico-projector or a micro-projector. The vehicle may be an aircraft having a cabin. The first portion of the ceiling may be positioned between two overhead bins. The first projector may be disposed on an overhead portion of the cabin of an aircraft. The first projector may be disposed on a first curtain header in the cabin of an aircraft.

The system may comprise a second projector disposed on an overhead portion of the cabin of the aircraft, wherein the second projector is configured to project a second image on a second portion of the ceiling. The second projector may be disposed on a second curtain header in the cabin of the aircraft. The first and second portions of the ceiling may be positioned between the first and second projectors. The first projector may include a first edge fader aperture and the second projector may include a second edge fader aperture, wherein the first and second edge fader apertures blend an interface between the first and second images. The first edge fader aperture may be positioned within the first projector between a first image engine and a first lens and the second edge fader aperture may be positioned within the second projector between a second image engine and a second lens. The system may include a control panel configured to control the projection of the first image by the first projector and the projection of the second image by the second projector. The control panel may be used to control a plurality of projectors within the vehicle.

Another example embodiment supported by the disclosure is a method of creating an image on a portion of a ceiling of a vehicle. The method comprises providing a first projector and projecting a first image from the first projector on a first portion of a ceiling of a vehicle, the first portion of the ceiling being adjacent to the first projector. The method may include controlling the first image projected by the first projector with a control panel. The image may be a moving image. The method may include providing a second projector and projecting a second image from the second projector on a second portion of the ceiling of the vehicle, the second portion of the ceiling being adjacent to the second projector. The method may include blending an interface between the first image and the second image. The method may include positioning the first projection on an overhead portion of a cabin of an aircraft.

Figure 1:
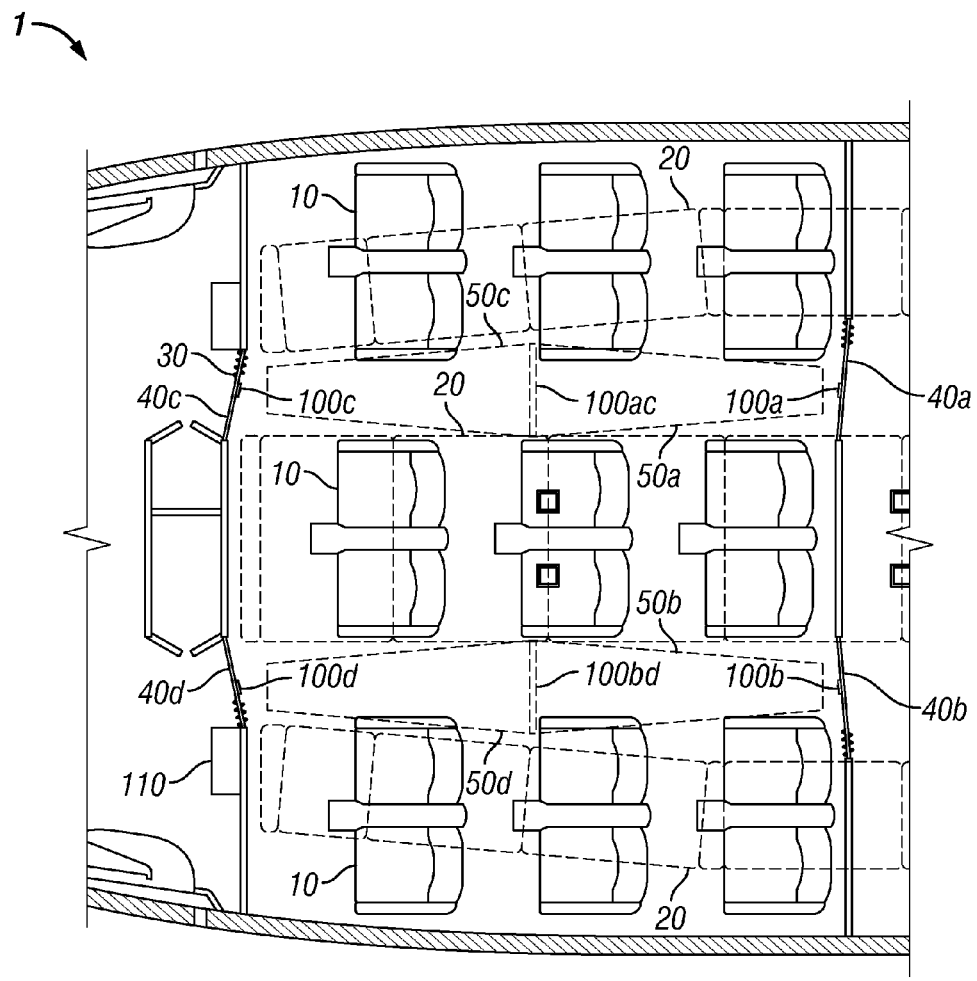
FIG. 1 is a partial top cross-section view of a portion of a vehicle having a plurality of projectors.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows a partial top cross-section view of a portion of a cabin of an aircraft 1. The cabin includes seats 10 and overhead bins 20. A plurality of projectors 100a-d (collectively projectors 100) are positioned adjacent ceiling portions 50a-d between overhead bins 20 above passenger walkways between the seats 10 rows. The projectors 100a-d may be mounted on an upper portion of the cabin of the aircraft 1 so that they are positioned above passengers walking through passenger walkways. The location of the projectors above the passengers may be such that a passenger moving about the cabin won't obscure the image projected from a projector 100. For example, projectors 100 may be mounted or positioned on a curtain header 40 that separate different portions of the aircraft 1. Curtains 30 on the curtain headers 40a-d (collectively curtain headers 40) may be used as a separation barrier to separate different portions of the aircraft 1. The projectors 100a-d are configured to project an image on the ceiling portion 50a-d adjacent to the projectors 100a-d. For example, projector 100a may project an image onto ceiling portion 50a, projector 100b may project an image onto ceiling portion 50b, projector 100c may project an image onto ceiling portion 50c, and projector 100d may project an image onto ceiling portion 50d. The projectors 100 may be a pico-projector or a micro-projector. As used herein, pico-projector or micro-projector means a hand held sized projector or smaller. The image may be projected in conjunction with audio, such as sound, from an onboard sound system. The onboard sound system could be a vehicle sound system and/or a personal sound system of a passenger.

A control panel 110 may be used to control the operation of the projectors 100a-d. The control panel 110 may be a panel mounted on a structure within the cabin of the aircraft 1. Alternatively, the control panel 110 could be a mobile device operated by a member of the flight crew. The control panel 110 may be used to project the same image on all ceiling portions 50 adjacent a projector 100. Likewise, the control panel 110 may permit projection of different images on different ceiling portions 50. For example, all the projectors 100 in one area of a vehicle may project a first image and all projectors 100 in a second area of a vehicle may project a second image. The image may be a static image that is based on a theme, such as starry skies, northern skies, nature scenes, galaxy or space scenes, or various other scenes or images as would be appreciated by one of ordinary skill in the art having the benefit of this disclosure. The images may be a static image or may be a moving image, such as a movie or a moving design such as shooting starts in the midst of starry skies. The configuration of seats 10, bins 20, curtains 30, curtain headers 40, ceiling portions 50a-d, projectors 100a-d, and control panel 110 shown in FIG. 1 is for illustrative purposes and may be varied as would be appreciated by one of ordinary skill in the art having the benefit of this disclosure. Further, the projectors 100a-d could be installed in various vehicles, such as a bus, train, ship, or other vehicle to project an image or images onto a portion of a ceiling or other surface as would be appreciated by one of ordinary skill in the art having the benefit of this disclosure.

Figure 2:
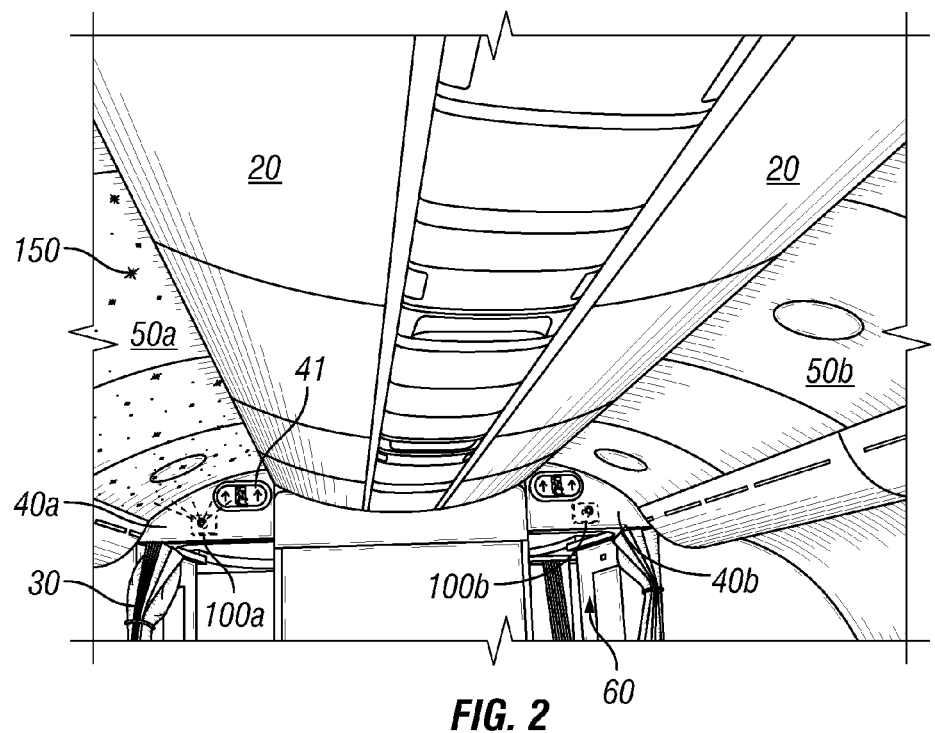
FIG. 2 is a perspective view of a portion of an interior of an aircraft having a projector.

FIG. 2 shows a perspective view of a portion of a cabin of an aircraft. The cabin includes a first projector 100a positioned on a curtain header 40a and a second projector 100b positioned on a curtain header 40b. The body of the projectors 100 may be partially hidden, camouflaged, and/or partially obscured on the curtain headers 40 so that substantially only the lens is visible. Curtains 30 are connected to the curtain headers 40 and may be used to selectively separate portions of the cabin. The projectors 100a and 100b are configured to project an image on an adjacent portion of the ceiling 50 of the cabin. For example, projector 100a is projecting an image 150 onto portion 50a adjacent to the projector 100a. The image 150 may be a static pattern, static image, or moving image. For example, the image 150 may be a pattern of twinkling stars as shown in FIG. 2. Alternatively, the image could be a static or animated illustration of a brand name, logo, or escape route instructions. The curtain header 40 may include an exits sign 41 and the ceiling portions 50a and 50b may be separated by an overhead bin 20. The projectors 100a and 100b may be operated independently and project different images or one projector 100b may not project an image while an adjacent projector 100a may project an image 150 as shown in FIG. 2. Images may be adjusted to compensate for elongation or foreshortening based on the curvature of the cabin portion upon which the image is projected in order to provide a clear and undistorted representation.

Figure 3:
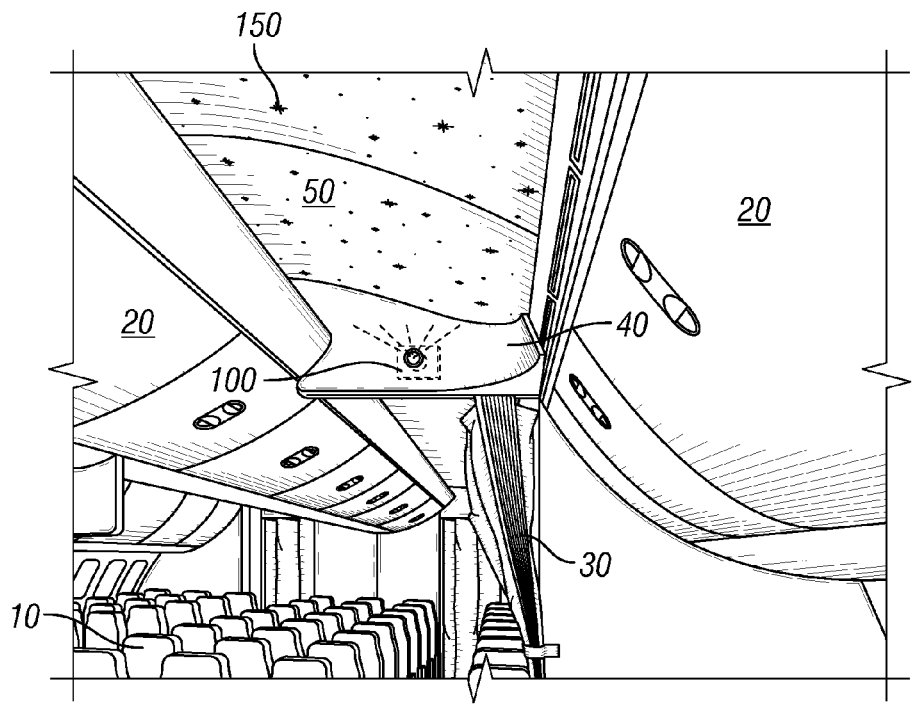
FIG. 3 is a perspective view of a portion of an interior of an aircraft having a projector.
Figure 4:
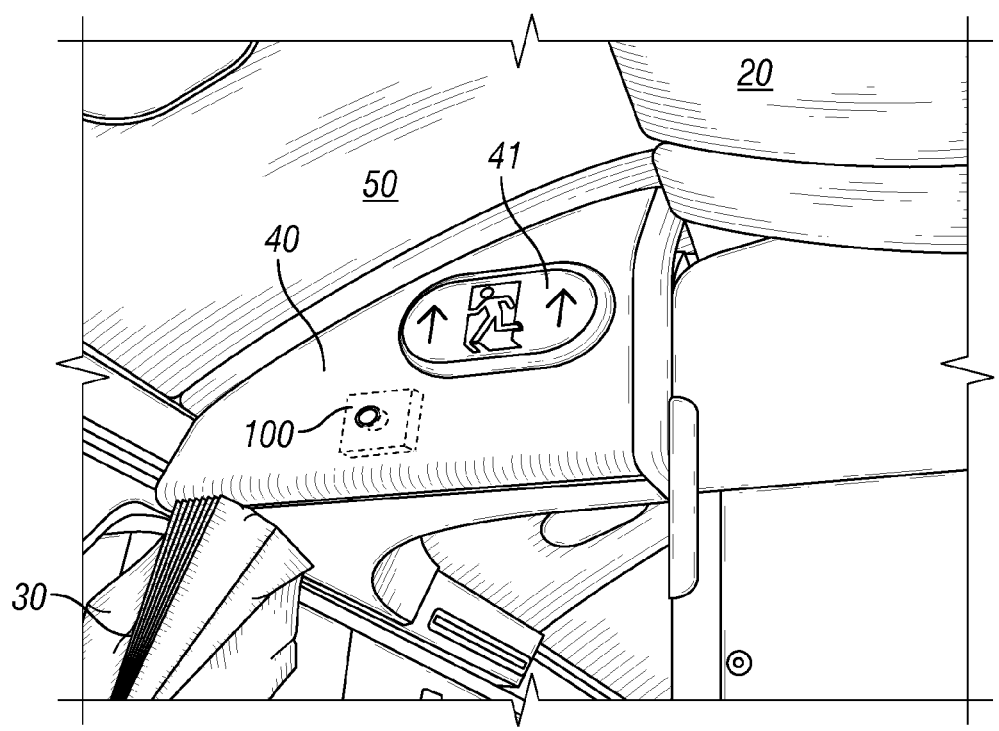
FIG. 4 is a perspective view of a portion of an interior of an aircraft having a projector.

FIG. 3 shows a projector 100 projecting an image 150 and an adjacent ceiling portion 50. The projector 100 may be positioned on an upper structure of the aircraft cabin, such as header 40, so that the projection of the image 150 is not obstructed by movement of passengers about the cabin. FIG. 4 shows a close up view of a projector 100 mounted on a curtain header 40 adjacent an exit sign 41. Alternatively, the projector 100 may be integrated into or within an exit side 41 or other wall or mounted item in the cabin. The projector 100 may be a pico-projector or micro-projector to enable the mounting or positioning the projector 100 at various locations within the vehicle. For example, a pico-projector or micro-projector may be mounted on an upper portion of a cabin adjacent to the ceiling to permit the projection of an image upon the ceiling. The projector 100 may have some or all of the body hidden inside of a structure, such as the curtain header, with only the lens of the projector being visible. The projector 100 may have a barrel portion surrounding the projection lens to prevent or reduce shining light into the eyes of passengers or crew who may be standing or waking in an aisle, or a very tall passenger. The barrel portion may be long enough to ensure it is not possible to observe the projector light directly, but only view reflected light from a projection surface. The projector 100 may have an external adjustment feature for alignment.

Figure 5:
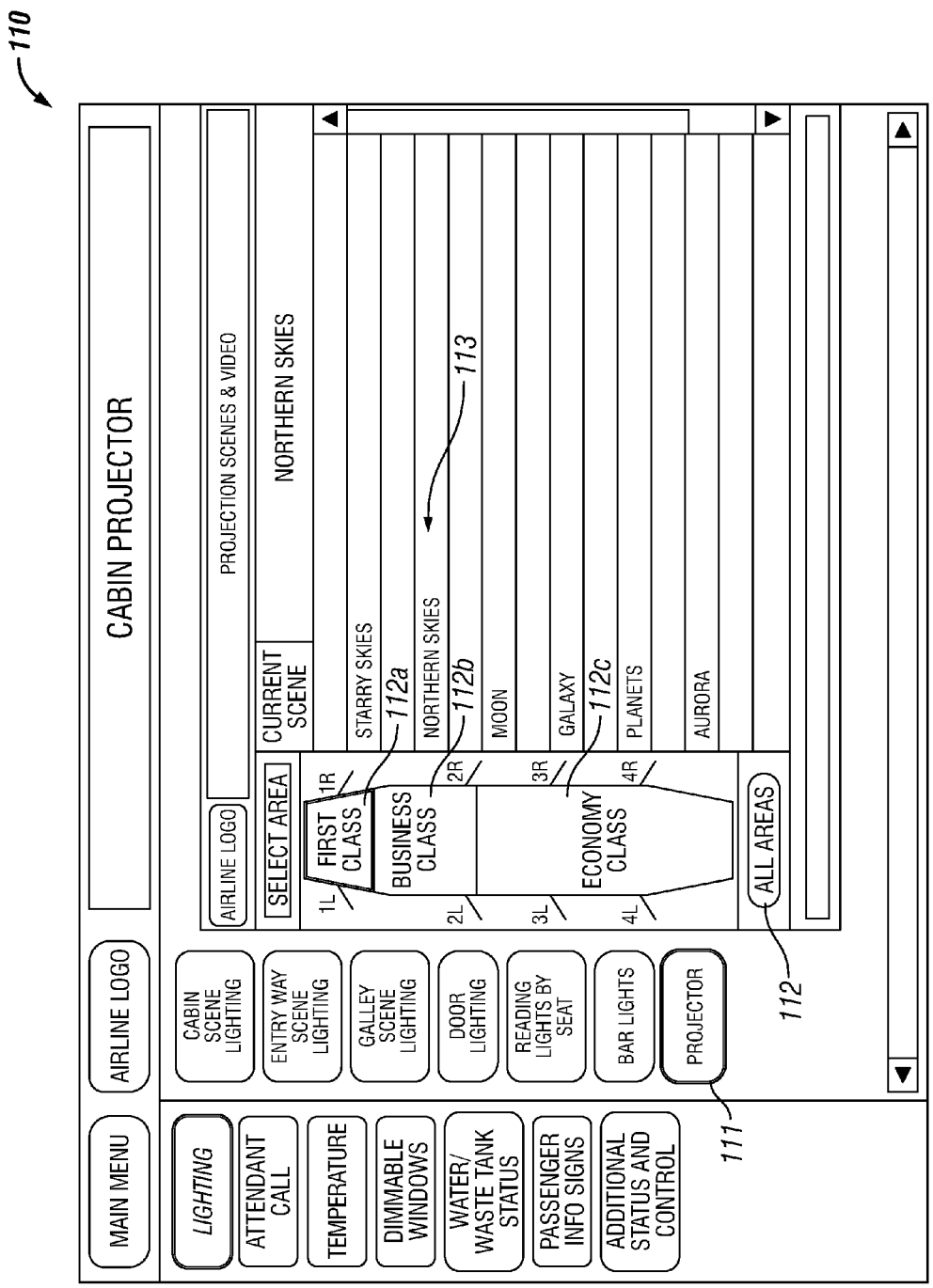
FIG. 5 shows one example of a control panel for controlling a plurality of projectors within an aircraft and options for flight attendants to select one.

A vehicle, such as an aircraft 1, may include a plurality of projectors 100 throughout the vehicle capable of projecting an image on an adjacent portion of the ceiling. The operation of the projectors may be controlled at a control panel 110 such as the control panel 110 shown in FIG. 5. The control panel 110 may include an interface 111 that permits the selection of projectors within the vehicle. The control panel 110 may include an interface that permits the control of projectors located in various locations within the vehicle. For example, interfaces 112a, 112b, and 112c may permit the operation of projectors within a specified area of the vehicle. The control panel 110 may also include an interface 112 to permit the uniform operation of projectors 100 throughout the vehicle. The images projected by the projectors 100 may be determined based on settings 113 on the control panel. For example, the control panel 110 may be used to change the image between various images, such as, starry skies and norther skies. Various themes and configurations may be included on the control panel 110 as would be appreciated by one of ordinary skill in the art having the benefit of this disclosure. The layout of the control panel 110 as shown in FIG. 5 is for illustrative purposes and may be varied as would be appreciated by one of ordinary skill in the art having the benefit of this disclosure.

Figure 6:
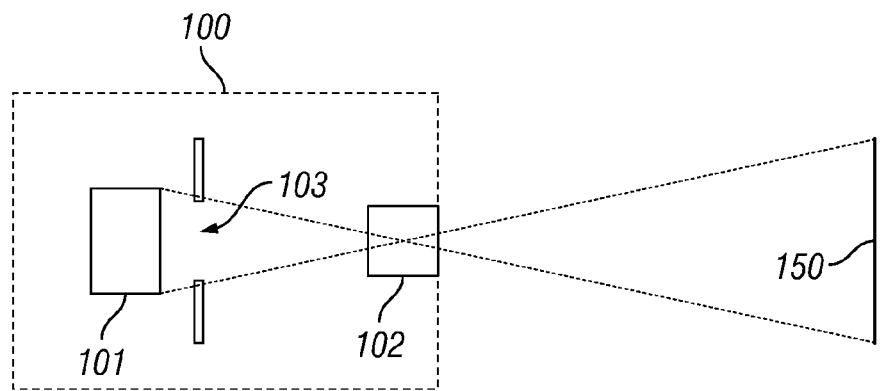
FIG. 6 shows a schematic of one example of a projector with projected scene edge control.
Figure 7:
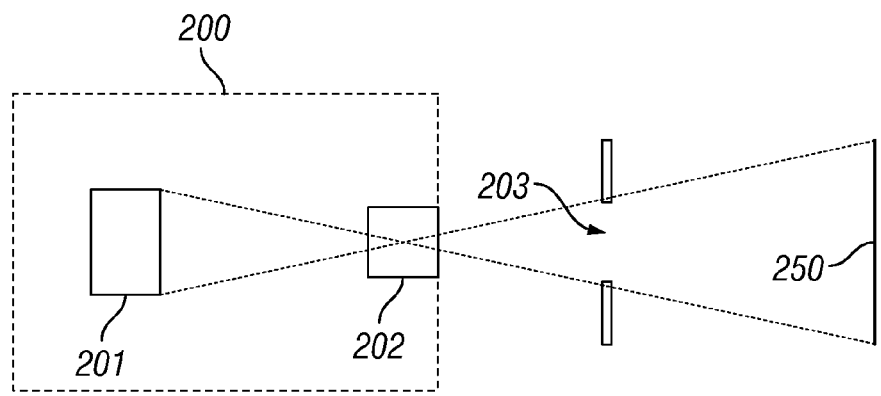
FIG. 7 shows a schematic of one example of a projector with projected scene edge control.

FIG. 6 shows a schematic of one configuration of a projector 100 having an aperture 103. The aperture 103 may be positioned between an image engine 101 and a lens 102 within the projector 100. The aperture 103 may aid in blending the edges of the image 150 projected by the projector 100, which may be desired. For example, there may be an interface, such as interface 100ac or 100bd shown in FIG. 1, between two images projected on adjacent ceiling portions, such as portions 100a and 100c or portion 100d and 100b shown in FIG. 1. The edges of the images projected by the projector 100 may not be sharp, but rather fuzzy due to the use of the aperture 103. The fuzzy edges of adjacent images may permit improved blending of the two images add interfaces such as 100ac or 100bd shown in FIG. 1. FIG. 7 shows a schematic of one configuration of a projector 200 having an aperture 203 to aid in the blending of adjacent images as discussed herein. The projector 200 includes an image engine 201 and lens 202 with an aperture 203 positioned exterior of the projector 200. The projection of the image 250 through an aperture 203 may provide fuzzy edges.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A vehicle projection system comprising:
   a first projector positioned adjacent to a first portion of a ceiling of a vehicle;
   wherein the first projector is configured to project a first image on the first portion of the ceiling;
   a second projector disposed adjacent to a second portion of the ceiling of the vehicle;
   wherein the second projector is configured to project a second image on the second portion of the ceiling;
   wherein the first portion of the ceiling and the second portion of the ceiling are positioned between the first and second projectors; and
   wherein the first projector includes a first edge fader aperture and the second projector includes a second edge fader aperture, wherein the first and second edge fader apertures blend an interface between the first and second images, wherein the first edge fader aperture is positioned within the first projector between a first image engine and a first lens and the second edge fader aperture is positioned within the second projector between a second image engine and a second lens.

2. The system of claim 1, wherein the image is a moving image.

3. The system of claim 1, wherein the image is one of a starry sky, northern sky, moon, constellation, or other natural sky scene.

4. The system of claim 3, wherein the image is projected in conjunction with sound from an on board sound system.

5. The system of claim 1, wherein the projector is one of a pico-projector and a micro-projector.

6. The system of claim 1, the vehicle further comprising an aircraft having a cabin.

7. The system of claim 6, wherein the first portion of the ceiling is positioned between two overhead bins.

8. The system of claim 6, wherein the first projector is disposed on an overhead portion of the cabin of the aircraft.

9. The system of claim 8, wherein the first projector is disposed on a first curtain header in the cabin.

10. The system of claim 8, wherein the second projector is disposed on an overhead portion of the cabin of the aircraft.

11. The system of claim 10, wherein the second projector is disposed on a second curtain header in the cabin.

12. The system of claim 10, further comprising a control panel configured to control the projection of the first image by the first projector and the projection of the second image by the second projector.

13. The system of claim 6, wherein the first projector further comprises a plurality of projectors positioned to an adjacent portion of the ceiling of the cabin and wherein each projector is configured to project an image on the adjacent portion of the ceiling.

14. The system of claim 13, further comprising a control panel configured to control the projection of the image by the plurality of projectors.

15. A method of creating an image on a portion of a ceiling of a vehicle comprising:
    providing a first projector;
    projecting a first image from the first projector on a first portion of a ceiling of a vehicle, the first portion of the ceiling being adjacent to the first projector;
    providing a second projector;
    providing a first fader aperture;
    projecting the first image through the first fader aperture;
    providing a second fader aperture;
    projecting the second image through the second fader aperture;
    projecting a second image from the second projector on a second portion of the ceiling of the vehicle, the second portion of the ceiling being adjacent to the second projector, wherein the first and second portions of the ceiling are positioned between the first and second projectors; and
    blending an interface between the first image and the second image,
    wherein providing the first fader aperture further comprises providing the first fader aperture between an image engine of the first projector and a lens of the first projector and wherein providing the second fader aperture further comprises providing the second fader aperture between an image engine of the second projector and a lens of the second projector.

16. The method of claim 15, further comprising controlling the first image projected by the first projector with a control panel.

17. The method of claim 15, wherein the image is a moving image.

18. The method of claim 15, wherein providing a first projector further comprises positioning the first projector on an overhead portion of a cabin of an aircraft.

19. A vehicle projection system comprising:
    a first projector comprising a first image engine and a first lens, the first projector being positioned adjacent to a first portion of a ceiling of a vehicle, the first projector being configured to project a first image on the first portion of the ceiling;
    a second projector comprising a second image engine and a second lens, the second projector being disposed adjacent to a second portion of the ceiling of the vehicle, the second projector being configured to project a second image on the second portion of the ceiling;
    a first fader aperture being positioned between the first lens and the first portion of the ceiling;
    a second fader aperture being positioned between the second lens and the second portion of the ceiling;
    wherein the first portion of the ceiling and the second portion of the ceiling are positioned between the first and second projectors; and wherein the first and second fader apertures blend an interface between the first and second images.

\* \* \* \* \*